United States Patent [19]

French et al.

[11] Patent Number: 5,717,535
[45] Date of Patent: Feb. 10, 1998

[54] BLOCK ADDRESS INTEGRITY CHECK FOR STORAGE MEDIUM

[75] Inventors: Catherine Anne French; Prafulla Bollampali Reddy; Jeffrey Alan Miller, all of Santa Cruz, Calif.

[73] Assignee: Seagate Technology, Inc., Scotts Valley, Calif.

[21] Appl. No.: 377,867

[22] Filed: Jan. 25, 1995

[51] Int. Cl.$^6$ ............................... G11B 5/09; G11B 5/596
[52] U.S. Cl. .................. 360/53; 360/48; 360/49; 360/78.14
[58] Field of Search ................... 360/53, 48, 51, 360/78.14, 49; 370/107, 109

[56] References Cited

U.S. PATENT DOCUMENTS

| | | | |
|---|---|---|---|
| 4,321,632 | 3/1982 | Leis et al. | 360/49 |
| 4,567,591 | 1/1986 | Gray et al. | 370/109 |
| 4,593,353 | 6/1986 | Pickholtz | 380/4 |
| 5,036,408 | 7/1991 | Leis et al. | 360/48 |
| 5,253,131 | 10/1993 | Chevalier | 360/78.14 |
| 5,278,703 | 1/1994 | Rub et al. | 360/51 |
| 5,353,352 | 10/1994 | Dent et al. | 380/37 |
| 5,404,249 | 4/1995 | Seki | 360/53 X |
| 5,434,807 | 7/1995 | Yoshida | 364/717 |
| 5,438,462 | 8/1995 | Copolillo | 360/53 |

OTHER PUBLICATIONS

"Applications of Block Codes for Error Control in Data Storage Systems," S. Lin and D.J. Costello, Jr., *Error Control Coding Fundamentals and Applications*, Copyright 1983 by Prentice–Hall, Inc., pp. 528–531.

"Initializing the ECC Shift Register With a Specially Selected Pattern," *Practical Error Correction Design for Engineers*, N. Glover and T. Dudley, Second Edition, Data Systems Technology Corp., Broomfield, CO, 1988, pp. 264–265.

*Primary Examiner*—Aristotelis M. Psitos
*Assistant Examiner*—Regina Y. Neal
*Attorney, Agent, or Firm*—Westman, Champlin & Kelly

[57] ABSTRACT

A magnetic disc storage system includes a rotating magnetic disc and a read/write transducer positioned proximate a recording surface of the magnetic disc for reading and writing information on the recording surface. Data stored on the recording surface is altered based upon the address of the data. During readback, a pseudorandom number generator receives a desired address as a seed input and provides a pseudorandom number output. An XOR gate provides an XOR output in response to the pseudorandom number output and the readback signal from the read/write transducer. An error detection circuit provides a decoded data output and an error flag output in response to the XOR output. An error during readback indicated by the error flag output is indicative of an incorrect address of the readback signal in comparison to the desired address. During a write operation, data is provided to an error detector encoder circuit which provides an encoded data output to an XOR gate. A pseudorandom number generator receives the address of the data as a seed input and provides a pseudorandom number to the XOR gate. The output of the XOR gate is written on the surface of the magnetic disc by the read/write transducer.

17 Claims, 2 Drawing Sheets

BLOCK ADDRESS INTEGRITY CHECK FOR STORAGE MEDIUM

BACKGROUND OF THE INVENTION

The present invention relates to magnetic disc drives. More particularly, the present invention relates to addressing data in a magnetic disc drive.

Magnetic recording devices such as disc drives are used to magnetically store USER DATA. Typically, the entire magnetic medium is not used to record the user data. A portion of the information carried on the medium is called a "header" and carries information related to the location of the user data which (in most formats) follows the header. The header includes a block address which is an address used to identify the location of the data on the surface of the medium. For example, the address may include track number and sector of the data. The header may also contain flags related to the data.

As can be seen from the above description, a portion of the magnetic medium must be allocated for header information. This portion of the medium is essentially wasted and is not used for storage of user data. It would be desirable to store user data on the portion of the medium dedicated to header information. This could increase data storage capacity by approximately 1% to 5%. Such an achievement would increase the storage capacity of the magnetic medium for user data.

SUMMARY OF THE INVENTION

A magnetic disc drive storage system includes a magnetic disc having a recording surface. Data is carried on the recording surface. A read/write transducer positioned proximate the recording surface is used for reading and writing information on the surface. During readback of data, a pseudorandom number generator receives a desired address as a seed input and provides a pseudorandom number output. An XOR gate provides an XOR output in response to the pseudorandom number output and a readback signal from the read/write transducer. Error detection circuitry provides a decoded data output representative of user data and an uncorrectable error flag output in response to the XOR output. This flag indicates that there was either an uncorrectable readback error or the block address was not the desired block address.

During a write operation, user data is provided to an error detection encoder circuit which provides an encoded output to an XOR gate. A pseudorandom number generator receives address information as a seed input and provides a pseudorandom number output to the XOR gate. The output from the XOR gate is written to the magnetic disc by the read/write transducer. Thus, user data stored on the disc is altered based upon the address of the data.

DETAILED DESCRIPTION OF THE PREFERRED EMBODIMENTS

Figure 1:
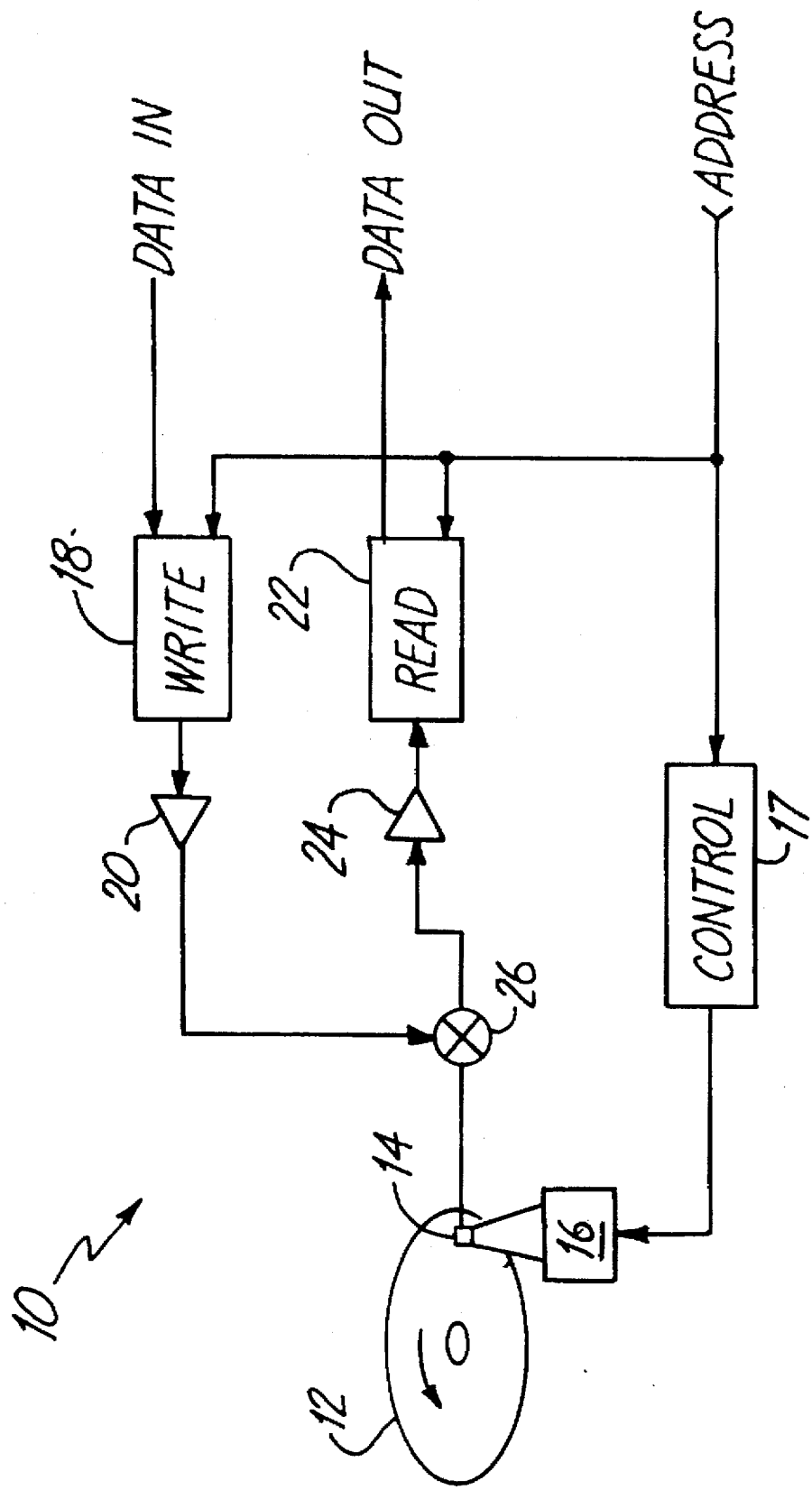
FIG. 1 is a simplified block drawing of a magnetic disc storage system.

FIG. 1 is a block schematic diagram of a magnetic disc storage system 10 including a rotating magnetic disc 12 proximate a read/write transducer 14 which flies over the disc surface. Transducer 14 is positioned over the surface of disc 12 by positioner 16 in response to a control signal from control 17. To write information, address information and user data information are provided to write circuitry 18. Write circuitry 18 provides a write signal to amplifier 20. Write circuitry 18 provides a write signal to amplifier 20. Multiplexer 26 directs the amplified write signal to read/write transducer 14. During readback, a readback signal from read/write transducer 14 is provided to amplifier 24 through multiplexer 26. The amplified readback signal is provided to read circuitry 22. Read circuitry 22 also receives address information and provides a data output signal.

In disc system design, headerless format is desirable, with the benefit that there is more room on the disc to store user data. However, headerless formats require that data recorded on a disc be accessible without the benefit of having the address of the data block recorded in a header preceding the data block. In order to ensure that the desired data block has been accessed during a read operation, it is desirable to build in some kind of block address integrity check that can be used to verify that the proper block has been accessed. Preferably, this block address integrity check would not require that any extra bytes be recorded (which would defeat the purpose of the headerless formats), and would be independent of the error correction and detection code being utilized. The present invention achieves these goals as described below. Additionally, the present technique of embedding address information in user data can be applied to formats that use headers as an added integrity check. For example, the embedded address data can be used to determine if the readback head has gone off track since reading the last header.

Figure 2:
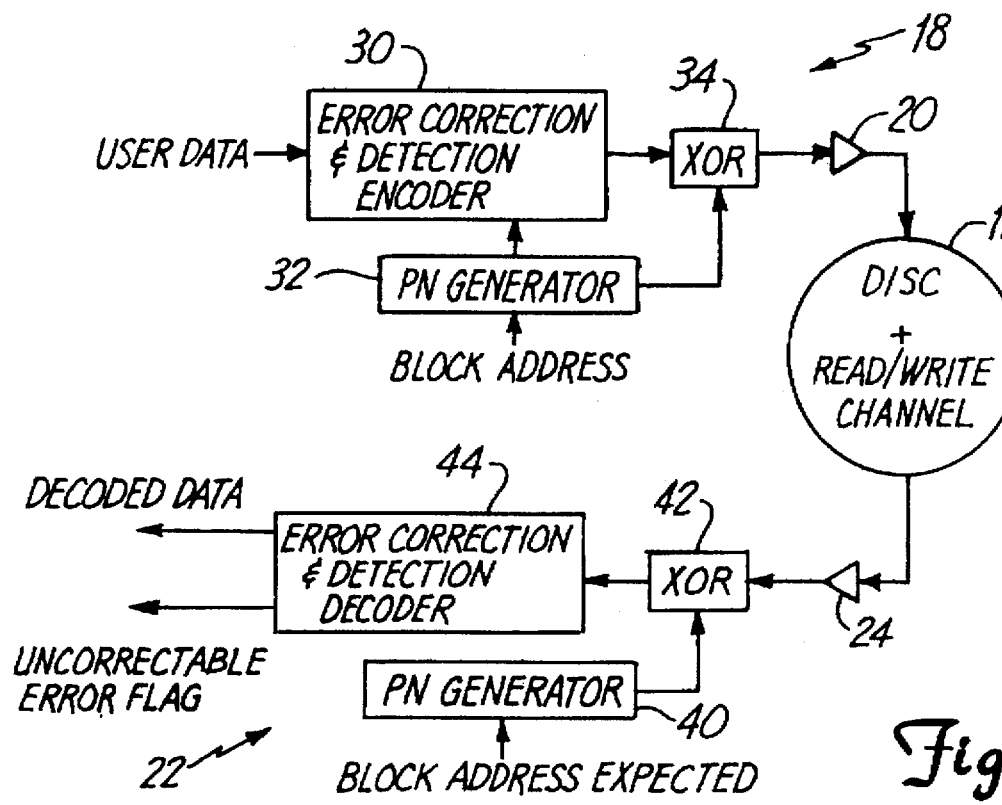
FIG. 2 is a block diagram of circuitry for providing headerless disc formats in accordance with the invention.

FIG. 2 is a block diagram of circuitry for providing headerless disc formats in accordance with the invention. FIG. 2 shows disc 12, write circuitry 18, write amplifier 20, readback amplifier 24 and readback circuitry 22. Write circuitry 18 includes error correction and detection encoder 30, pseudorandom (or pseudonoise, PN) generator 32 and exclusive OR (XOR) gate 34. User data is provided to encoder 30 which provides an encoded output to XOR gate 34. The block address of the location of the information to be written on disc 12 is provided as a seed input to pseudonoise generator 32 which provides a second input to XOR gate 34. The output of XOR gate 34 is provided to write amplifier 20 so that data is written on disc 12 by transducer 14 as shown in FIG. 1. Readback circuitry 22 includes a pseudorandom (or pseudonumber) generator 40, XOR gate 42 and error correction and detection decoder circuitry 44. XOR gate 42 receives a readback signal from transducer 14 representative of information stored on magnetic disc 12. The readback signal is amplified by readback amplifier 24. XOR gate 42 also receives an input from PN generator 40 which receives the expected address of the data as a seed input. The output from XOR gate 42 is provided to error correction and detection decoder 44 which provides a decoded data output and an uncorrectable error flag output.

In FIG. 2, the block address is used as the seed for a pseudorandom, or pseudonoise (PN), sequence generator 32. Generator 32 is used to produce random bytes which are XORed with the data bytes just prior to recording. Each unique block address produces a different sequence of bytes out of generator 32. Upon reading disc 12, the block address that is expected at that location on disc 12 is used as the seed in an identical PN sequence generator 40. Generator 40 can physically be the same generator as that used on the record side, or it may be a separate but identical piece of hardware. The output of generator 40 is XORed with the bytes being read from the disc. If the expected block address is indeed being accessed, the XOR prior to writing and the XOR after reading will cancel each other. In this case, the original data (possibly with errors) will be decoded by the error correction block 44 in the normal manner. If the data block being read is not the expected block, the XOR prior to writing will be different than that after reading. In this case, the input to the error correction block 44 will be essentially "garbage," or in other words, sequences with many errors. These blocks will be flagged as uncorrectable with high probability by the error correction and detection circuitry 44. This is true independent of the number of error correction and detection parity bytes/bits and of the actual correction/detection scheme employed, provided that this scheme is powerful enough to detect that large numbers of errors are uncorrectable. A suitable error correction and detection technique is described for the IBM 3370 disc system in *Error Control Coding: Fundamentals and Applications*, S. Lin and D. J. Costello, Prentice-Hall, 1983, Englewood Cliffs, N.J., pages 528–531. More complex examples include the ISO standards for magneto-optic recording and the QIC (quarter-inch cartridge) tape standards. However, the invention is not limited to the techniques.

The XOR gate as described herein is a byte-wide XOR, where the individual bits within the data byte are XORed. Thus, the XOR gate is really eight individual XOR gates to provide an eight-bit byte XOR. Further, although the invention as described herein refers to XOR gates, any suitable Galois field addition over the field that the error correction and detection codes are based is considered within the scope of the invention and could be implemented by one skilled in the art.

Figure 3:
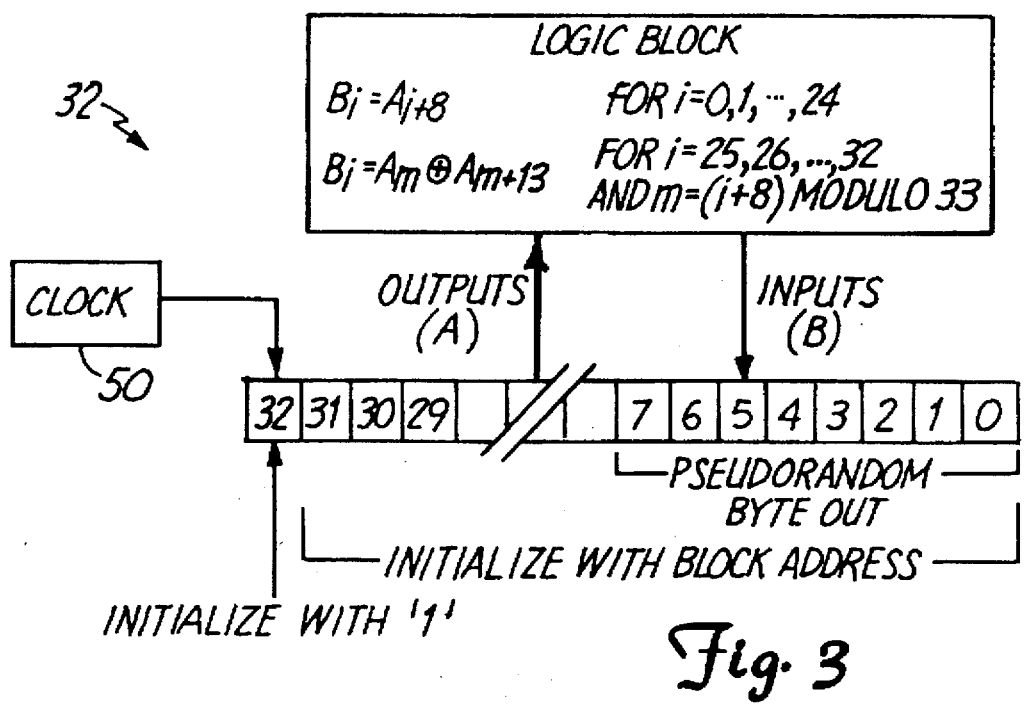
FIG. 3 is a diagram illustrating operation of a pseudorandom number generator used in the block diagram of FIG. 2.

One preferred embodiment of the PN sequence generator 32 (or 40) is illustrated in FIG. 3. The PN generator 32 consists of 33 register cells, with inputs and outputs connected to a logic block. The register cells are one bit wide and are clocked on the same clock as the data bytes. PN generator 32 is sufficient to hold a block address up to four bytes (32 bits) long, but could easily be expanded to accommodate block addresses larger than four bytes. The extra register cell at the far left of FIG. 3 is required so that a block address of zero will not produce all zeros out of PN generator 32. There is no reason that this extra cell must be included if PN generator 32 is used solely for the purpose proposed here (i.e. the headerless technique described herein will function properly even if an all zero block address input provides an all zero output from generator 32). However, if generator 32 is to be used to randomize data for some other reason (i.e. error tolerance), the extra cell should be included so that an all zero input will provide a non-zero output. Data is clocked by clock 50 at a rate once per every eight data bits (i.e. once per every byte).

PN sequence generator 32 comprises a plurality of flip flops which operate in accordance with equations shown in the logic block of FIG. 3 where B represents the input to a flip flop and A represents the output from a flip flop, the flip flops are connected to follow the equations:

$$B_I = A_{I+8}; \text{ for } I = 0\text{--}24; \quad \text{EQUATION 1}$$
$$B_I = A_M \text{ XOR } A_{M+13} \text{ for } I = 25\text{--}32, M = (I+8) \text{ Modulo } 33 \quad \text{EQUATION 2}$$

The output byte comprises bits 0–7.

It should be noted that PN generator 32 of FIG. 3 is equivalent to a binary feedback shift register based on the primitive polynomial $x^{33}+x^{13}+1$, and shifted eight times per clock. The logic block driving the inputs to the register cells in FIG. 3 represents the result of these eight shifts. From this analogy, it is clear that the sequence of bytes out of PN generator 32 of FIG. 3 repeats every $2^{33}-1$ bytes.

Although the present invention has been described with reference to preferred embodiments, workers skilled in the art will recognize that changes may be made in form and detail without departing from the spirit and scope of the invention. For example, it is understood that although the various functional blocks of the invention are shown separately, it is within the scope of the invention to implement these functions in software or hardware, and either discretely or integrated together. Further, although the read and write circuitry is shown as separate elements, it is within the scope of this invention to use the same circuitry for both reading and writing. Additionally, although the present invention has been described with reference to magnetic storage discs, it is equally applicable to other types of storage media such as tape or optical storage.

What is claimed is:

1. A magnetic disc storage system comprising:

a magnetic disc having a recording surface;

a read/write transducer positioned proximate the recording surface of the magnetic disc for reading and writing information on the recording surface;

a pseudorandom number generator receiving a desired address corresponding to a location on the surface of the magnetic disc as a seed input and providing in response a pseudorandom number output;

an XOR gate receiving as inputs the pseudorandom number output and a readback signal from the read/write transducer and providing an XOR output in response to the pseudorandom number output and the readback signal from the read/write transducer;

an error detection circuit receiving the XOR output and providing a decoded data output and an error flag output in response to the XOR output;

wherein address information is contained in the data and an error flag output from the error detection circuit indicates that an address of the readback signal is different than the desired address;

an error correction encoder circuit which has a user data input and an encoded data output;

a pseudorandom number generator which has a seed input receiving a data address corresponding to a location on the surface of the magnetic disc and providing a pseudorandom number output; and a XOR gate receiving as inputs the pseudorandom number output and the encoded data output and providing a write signal to the read/write transducer comprising an exclusive OR function of the pseudorandom number output and the encoded data output.

2. The magnetic disc storage system of claim 1 wherein each of the pseudorandom number generators include a plurality of flip flops.

3. The magnetic disc storage system of claim 1 wherein each of the pseudorandom number generators include a plurality of XOR gates.

4. The magnetic disc storage system of claim 1 wherein the error detection circuit includes an error correction circuit for correcting errors in the readback signal and the error flag is representative of an uncorrectable error or an incorrect address.

5. The magnetic disc storage system of claim 1 wherein each of the pseudorandom number generators are clocked once per every data byte and the sequence of bytes repeats every $2^N-1$ clock cycles for a primitive binary polynomial of degree N.

6. A magnetic disc storage system, comprising:

a magnetic disc;

a magnetic transducer proximate the magnetic disc for reading and writing information on the magnetic disc, the magnetic transducer providing a readback signal representative of user data and the embedded address of the user data on the disc; and decoding circuitry connected to the transducer which receives the readback signal and a desired address and responsively provides a user data output and an error output, wherein the error output indicates that an embedded address of the user data output is different than the desired address.

7. The magnetic disc of claim 6 wherein decoding circuitry includes:

a pseudorandom number generator which receives the desired address as a seed input and provides a pseudorandom number output, wherein the readback signal is altered based upon the pseudorandom number output.

8. The magnetic disc of claim 6 wherein the decoding circuitry includes:

an XOR gate which receives the readback signal and the signal related to the desired output and responsively provides an XOR output.

9. The magnetic disc of claim 8 wherein the decoding circuitry further includes an error decoding circuit which receives the XOR output and responsively provides the user data output and the error output.

10. The magnetic disc of claim 6 including encoding circuitry which receives a user data write signal and a desired write address and responsively provides a write signal to the magnetic transducer.

11. The magnetic disc of claim 10 wherein the encoding circuitry includes:

an error detection encoder which receives the user data write signal and responsively provides an error detection encoded output.

12. The magnetic disc of claim 11 wherein the encoding circuitry further includes:

a pseudorandom number generator which receives the desired write address as a seed input and responsively provides a pseudorandom number output.

13. The magnetic disc of claim 12 wherein the encoding circuitry further includes:

an XOR gate which receives the error detection encoded output and the pseudorandom number output and provides the write signal to the magnetic transducer.

14. The magnetic disc of claim 6 wherein the decoding circuitry includes error correction circuitry which corrects errors in the readback signal and can recognize and flag uncorrectable errors.

15. A system for storing information, comprising:

a storage medium;

a transducer positioned proximate the storage medium for reading and writing information on the storage medium;

encoding circuitry comprising:

a pseudorandom number generator for receiving a desired write address as a seed input and providing a pseudorandom number output;

an error detection encoder circuit receiving user data as an input and providing an encoded output;

an XOR gate providing a write signal to the transducer in response to the encoded output and the pseudorandom number output; and decoding circuitry comprising:

a pseudorandom number generator which receives a desired read address as a seed input and provides a pseudorandom number output;

an XOR gate which receives a readback signal from the transducer and the pseudorandom number output and provides and XOR output;

an error detection decoder circuit which receives the XOR output and provides a user data output representative of user data stored on the magnetic medium and an error flag output representative of an error condition in the readback signal including a difference between the desired read address and a location of the user data stored on the magnetic medium.

16. In a magnetic disc storage system, a method of encoding data to be stored on a magnetic storage disc, comprising:

receiving a user data signal;

error encoding the user data signal and providing an error encoded output;

receiving a desired data address;

generating a pseudorandom number using the desired data address as a seed;

exclusive ORing the pseudorandom number with the error encoded output and providing a write signal output; and writing the write signal output on the magnetic storage disc at a location related to the desired data address.

17. In a magnetic disc storage system, a method of decoding data stored on a magnetic storage disc, comprising:

receiving a readback signal representative of information stored on the magnetic storage disc located at a data address;

providing an expected data address;

generating a pseudorandom number using the expected data address as a seed;

exclusive ORing the pseudorandom number with the readback signal and providing an XOR output;

providing a user data output based upon the XOR output; and providing an error output based upon the XOR output in response to a difference between the data address and the expected address.

* * * * *